United States Patent [19]

Wideman

[11] Patent Number: 4,960,834

[45] Date of Patent: Oct. 2, 1990

[54] CARBOXYLATED SYNDIOTACTIC 1,2-POLYBUTADIENE

[75] Inventor: Lawson G. Wideman, Tallmadge, Ohio

[73] Assignee: The Goodyear Tire & Rubber Company, Akron, Ohio

[21] Appl. No.: 461,955

[22] Filed: Jan. 8, 1990

Related U.S. Application Data

[62] Division of Ser. No. 176,577, Apr. 1, 1988, Pat. No. 4,912,145.

[51] Int. Cl.$^5$ ............................................... C08F 8/06
[52] U.S. Cl. ............................ 525/333.2; 525/332.8; 525/332.9; 525/333.1; 525/383; 525/388
[58] Field of Search ............... 525/333.2, 332.8, 332.9, 525/333.1

[56] References Cited

U.S. PATENT DOCUMENTS 3,928,282 12/1975 Lohr, Jr. et al. ..................... 504/526
4,513,121 4/1985 Hansson et al. ................... 505/330.3
4,704,427 11/1987 Kitahara et al. ..................... 524/531

OTHER PUBLICATIONS

"Chemical Modification of Diene Polymers Via Homogeneous Hydrogenation and Hydroformylation", 27 Polymer Preprints, No. 2, pp. 95–96 (1986).

Primary Examiner—Bernard Lipman
Attorney, Agent, or Firm—Alvin T. Rockhill

[57] ABSTRACT

Syndiotactic 1,2-polybutadiene can be blended with various rubbers in order to improve the properties thereof. For instance, syndiotactic 1,2-polybutadiene can be blended with rubbers utilized in making tire treads in order to improve the heat build-up and wear characteristics of tires. The interaction and adhesion between syndiotactic 1,2-polybutadiene and rubbers can be improved by carboxylating the syndiotactic 1,2-polybutadiene. The presence of carboxylic acid groups on the syndiotactic 1,2-polybutadiene also greatly improves interaction with fillers commonly utilized in rubber compounding, such as carbon black. This invention discloses a process whereby syndiotactic 1,2-polybutadiene can be easily and inexpensively carboxylated. This invention more specifically discloses a method for preparing carboxylated syndiotactic 1,2-polybutadiene which comprises: (1) reacting syndiotactic 1,2-polybutadiene with hydrogen and carbon monoxide in an organic medium to produce formyl syndiotactic 1,2-polybutadiene, wherein the syndiotactic 1,2-polybutadiene is in the form of small particles having a particle size of less than about 250 microns which are suspended in the organic medium; and (2) reacting the formyl syndiotactic 1,2-polybutadiene with oxygen to produce the carboxylated syndiotactic 1,2-polybutadiene.

21 Claims, No Drawings

CARBOXYLATED SYNDIOTACTIC 1,2-POLYBUTADIENE

This is a Divisional of application Ser. No. 071176,577, filed on Apr. 1, 1988, now U.S. Pat. No. 4,912,145.

BACKGROUND OF THE INVENTION

The suitability of various rubbers for certain specific applications can be improved by blending syndiotactic 1,2-polybutadiene (SPBD) with the rubber. For instance, SPBD fibers can be utilized as a tread base rubber in tires in order to improve their heat build-up and wear characteristics. For example, U.S. Pat. No. 4,274,462 discloses pneumatic tires having improved resistance against heat build-up which employ SPBD fibers in their tread base rubber. It has also been determined that SPBD can be blended into tire carcass formulations in order to improve the green strength thereof. In fact, the inclusion of SPBD in tire carcass formulations can eliminate the need for electron beam precure in tire building operations.

The interaction and adhesion of SPBD with rubbers and fillers, such as carbon black, can be improved by carboxylating the SPBD. As a general rule, it is highly desirable to increase the interaction between the SPBD and the rubber/filler. For this reason a means for carboxylating SPBD has been sought. Unfortunately, standard techniques for carboxylating organic materials have not led to the incorporation of significant amounts of carboxylic acid groups onto SPBD. For instance, the treatment of SPBD with sulfuric acid and formic acid has not resulted in appreciable incorporation of carboxylic acid groups onto SPBD.

SUMMARY OF THE INVENTION

The present invention relates to a technique for carboxylating SPBD in a relatively simple and inexpensive process which can be easily carried out on a commercial basis. The present invention more specifically relates to a method for preparing carboxylated syndiotactic 1,2-polybutadiene which comprises (1) reacting syndiotactic 1,2-polybutadiene with hydrogen and carbon monoxide in an organic medium to produce formyl syndiotactic 1,2-polybutadiene, wherein the syndiotactic 1,2-polybutadiene is in the form of small particles having a particle size of less than about 250 microns which are suspended in the organic medium: and (2) reacting the formyl syndiotactic 1,2-polybutadiene with oxygen to produce the carboxylated syndiotactic 1,2-polybutadiene.

The present invention further discloses a method for preparing carboxylated syndiotactic 1,2-polybutadiene which comprises: (1) hydroformylating syndiotactic 1,2-polybutadiene in an organic medium, wherein the syndiotactic 1,2-polybutadiene is in the form of small particles having a particle size of less than about 250 microns which are suspended in the organic medium, and wherein the syndiotactic 1,2-polybutadiene is hydroformylated in the presence of hydrogen, carbon monoxide, and a hydroformylation catalyst at a temperature which is within the range of about 25° C. to about 150° C. and at a pressure of at least about $1.013 \times 10^5$ Pascals (1 atmosphere), to produce formyl syndiotactic 1,2-polybutadiene; and (2) reacting the formyl syndiotactic 1,2-polybutadiene with oxygen to produce the carboxylated syndiotactic 1,2-polybutadiene.

DETAILED DESCRIPTION OF THE INVENTION

Various techniques for synthesizing syndiotactic 1,2-polybutadiene in organic solvents and water are known in the art. For example, U.S. Pat. No. 3,901,868 reveals a process for producing a polymer consisting essentially of syndiotactic 1,2-polybutadiene by the successive steps of:

(a) preparing a catalyst component solution by dissolving, in an inert organic solvent containing 1,3-butadiene, a cobalt compound, soluble in the organic solvent, such as (i) cobalt-β-diketone complex, (ii) cobalt-β-keto acid ester complex, (iii) cobalt salt of organic carboxylic acid, and (iv) halogenated cobalt-ligand compound complex, and an organoaluminum compound, (b) preparing a catalyst composition by mixing the catalyst component solution with an alcohol, ketone or aldehyde compound and carbon disulfide, (c) providing a polymerization mixture containing desired amounts of 1,3-butadiene, the catalyst composition and an inert organic solvent, and (d) polymerizing 1,3-butadiene at a temperature of −20° C. to 90° C.

U.S. Pat. No. 4,429,085 reveals a process for producing polybutadiene composed essentially of syndiotactic 1,2-polybutadiene in an aqueous medium comprising polymerizing 1,3-butadiene in said aqueous medium in the presence of (1) a catalyst composition microencapsulated in a polyene product which contains (a) at least one cobalt compound selected from the group consisting of (i) β-diketone complexes of cobalt, (ii) β-keto acid ester complexes of cobalt, (iii) cobalt salts of organic carboxylic acids having 6 to 15 carbon atoms, and (iv) complexes of halogenated cobalt compounds of the formula $CoX_n$, wherein X represents a halogen atom and n represents 2 or 3, with an organic compound selected from the group consisting of tertiary amine alcohols, tertiary phosphines, ketones and N,N-dialkylamides, and (b) at least one organoaluminum compound of the formula $AlR_3$, wherein R represents a hydrocarbon radical of 1 to 6 carbon atoms; and (2) carbon disulfide.

U.S. Pat. No. 4,463,146 discloses a process for producing polybutadiene composed essentially of syndiotactic 1,2-polybutadiene in tetrahydrofuran comprising polymerizing 1,3-butadiene in said tetrahydrofuran in the presence of (1) a catalyst composition microencapsulated in a polyene product which contains (a) at least one cobalt compound selected from the group consisting of (i) β-diketone complexes of cobalt, (ii) β-keto acid ester complexes of cobalt, (iii) cobalt salts of organic carboxylic acids having 6 to 15 carbon atoms, and (iv) complexes of halogenated cobalt compounds of the formula $CoX_n$, wherein X represents a halogen atom and n represents 2 or 3, with an organic compound selected from the group consisting of tertiary amines, alcohols, tertiary phosphines, ketones and N,N-dialkylamides, and (b) at least one organoaluminum compound of the formula $AlR_3$, wherein R represents a hydrocarbon radical of 1 to 6 carbon atoms: and (2) carbon disulfide.

The syndiotactic 1,2-polybutadiene which is carboxylated utilizing the technique of this invention can be prepared utilizing any polymerization technique. For instance, the syndiotactic 1,2-polybutadiene can be prepared in an organic solvent as is disclosed in U.S. Pat.

No. 3,901,868, which is incorporated herein by reference in its entirety. The syndiotactic 1,2-polybutadiene can also be prepared in an aqueous medium or tetrahydrofuran as is described in U.S. Pat. No. 4,429,085 and U.S. Pat. No. 4,463,146, both of which are incorporated herein by reference in their entirety.

In accordance with the present invention, the syndiotactic 1,2-polybutadiene being carboxylated is ground or spray congealed into a fine powder of about 60 mesh (less than 250 microns) or finer. In most cases, it will be appropriate to grind the syndiotactic 1,2-polybutadiene to a particle size of 80 mesh (less than 177 microns) or finer. For example, it is appropriate to grind the syndiotactic 1,2-polybutadiene to a particle size of 140 mesh (less than 105 microns). For purposes of this invention, the term "particle size" means that a powder of the designated particle size will pass through a screen of the designated size notwithstanding the fact that some of the particles may be larger than the designated particle size in some dimensions. For example, a syndiotactic 1,2-polybutadiene powder having a particle size of less than 250 microns will pass through a 60 mesh screen even though some of the particles in the powder may be longer than 250 microns on some dimensions.

The syndiotactic 1,2-polybutadiene in the form of a small particle size powder is suspended in an organic medium. Virtually any inert organic compound which is a liquid and which will dissolve the hydroformylation catalyst without adversely affecting it can be utilized as the organic medium. For instance, saturated aliphatic hydrocarbons and aromatic hydrocarbons can be utilized as the organic medium. Such compounds will normally contain from about 4 to about 10 carbon atoms per molecule and will be liquids under the conditions of the hydroformylation reaction. Some representative examples of suitable organic compounds include: pentane, isooctane, cyclohexane, normal-hexane, benzene, toluene, xylene, ethylbenzene and the like, alone or in admixture.

The organic medium utilized will be agitated sufficiently to keep the syndiotactic 1,2-polybutadiene particles suspended therein. This can be done by vigorously stirring or shaking the organic medium with the syndiotactic 1,2-polybutadiene suspended therein. The hydroformylation of the syndiotactic 1,2-polybutadiene involves reacting with both hydrogen and carbon monoxide to convert it into formyl syndiotactic 1,2-polybutadiene. In this reaction, double bonds in the syndiotactic 1,2-polybutadiene are consumed with aldehyde groups being attached to the polymeric backbone of the syndiotactic 1,2-polybutadiene. The hydroformylation of a double bond in syndiotactic 1,2-polybutadiene can be depicted as shown in the reaction shown below:

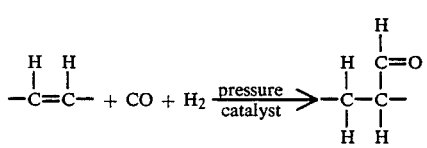

Hydroformylation is the addition of hydrogen and carbon monoxide to an alkylene to form an aldehyde. Hydroformylation reactions, commercially known as the Oxo Process, were discovered by O. Roelin in Germany (see U.S Pat. No. 2,327,066).

In order to carry out the hydroformylation step of the process of this invention, it is necessary to prepare a hydroformylation mixture comprising the syndiotactic 1,2-polybutadiene powder, carbon monoxide, hydrogen, a hydroformylation catalyst, and the liquid organic medium. The catalysts that can be employed in the process of this invention include hydridocarbonyltris(triphenylphosphine) cobalt, hydridocarbonyltris (triphenylphosphine) rhodium, and hydridocarbonyltris (triphenylphosphine) iridium and cobalt carbonyls. Cobalt carbonyls can be formed by the reaction of hydrogen and carbon monoxide with various cobalt compounds such as cobalt chloride, cobalt napthenate, cobalt carbonate, and the like. The preferred catalyst for use in the process of this invention is $RhH(CO)(PPh_3)_3$, wherein Ph represents a phenyl group. This rhodium system is preferred over the cobalt system and the iridium system because it produces only aldehydes in hydroformylation reactions. This is in contrast to the cobalt complex which can further reduce the aldehydes formed to alcohols. Another reason for preferring the rhodium complex is that it is catalytically active at a much lower temperature and pressure than are the cobalt and iridium complexes The rhodium catalyst is highly active at 25° C. at 1 atmosphere ($1.013 \times 10^5$ Pascals) pressure whereas the cobalt and iridium systems are only active highly at about 100° C. at 15 atmospheres ($1.52 \times 10^6$ Pascals) pressure.

The hydroformylation mixtures used in the process of this invention will generally contain from about 5 weight percent to about 75 weight percent syndiotactic 1,2-polybutadiene based upon the total weight of the hydroformylation mixture. Preferably, the hydroformylation mixtures of this invention will contain from about 10 weight percent to about 50 weight percent syndiotactic 1,2-polybutadiene based upon the total weight of the hydroformylation mixture. The amount of hydroformylation catalyst employed in the hydroformylation mixtures of this invention is based on the amount of syndiotactic 1,2-polybutadiene charged into the hydroformylation mixture. Generally, the weight ratio of syndiotactic 1,2-polybutadiene to the catalyst will range between about 50:1 and about 10,000:1. In most cases, the weight ratio of syndiotactic 1,2-polybutadiene to the catalyst will range between about 500:1 and about 5,000:1.

The hydroformylation mixtures utilized in the process of this invention will also, of course, contain carbon monoxide and hydrogen. The carbon monoxide and hydrogen can be incorporated into the hydroformylation mixtures of this invention by charging the reaction vessel utilized containing the hydroformylation mixture with pressurized carbon monoxide and hydrogen. If the $RhH(CO)(PPh_3)_3$ catalyst is employed, only a minimal amount of pressure is required as little as only about 1 atmosphere ($1.013 \times 10^5$ Pascals). However, if the $CoH(CO)(PPh_3)_3$ or IrH— $(Co)(PPH_3)_3$ catalyst is employed, then substantially more pressure will be required (about $1.0 \times 10^6$ Pascals). In the case of the $RhH(CO)(PPh_3)_3$ catalyst a $H_2/CO$ pressure of $1.4 \times 10^6$ Pascals to $6.9 \times 10^6$ Pascals is preferred. If a cobalt carbonyl, $CoH(CO)(PPh_3)_3$ or $IrH(Co)(PPH_3)_3$ catalyst is employed, the $H_2/CO$ pressure will preferably range between $1.8 \times 10^6$ Pascals and $6.9 \times 10^6$ Pascals. The $H_2/CO$ mixtures used to pressurize the reaction vessels of this invention can have widely varying ratios of $H_2$ to CO. Normally it will be desirable for the $H_2/CO$ mixtures of this invention to contain from about 10 mole percent to about 90 mole percent hydrogen and from about 10 mole percent to about 90 mole percent CO. It is generally preferred for the hydrogen-carbon monoxide mixtures of this invention to contain about 40 mole percent to 60 mole percent hydrogen and about 40 mole percent to 60 mole percent carbon monoxide. It is more preferred for the hydrogen-carbon monoxide mixtures of this invention to contain about 50 mole percent hydrogen and about 50 mole percent carbon monoxide.

Since it is important for the syndiotactic 1,2-polybutadiene powder, carbon monoxide, hydrogen, and catalysts to be distributed somewhat uniformly throughout the hydroformylation mixture, it is important to continue to agitate the hydroformylation mixture during the hydroformylation reaction. The hydroformylation process can be effectuated at any temperature ranging from about 25° C. to about 150° C. if the RhH(CO)(PPh$_3$)$_3$ catalyst is employed. If a cobalt carbonyl, CoH(CO)(PPh$_3$)$_3$ or IrH(CO)(PPh$_3$)$_3$ catalyst is employed, a temperature of about 80° C. to about 150° C. will be required in order to carry out the hydroformylation of this invention. If the RhH(CO)(PPh$_3$)$_3$ is employed, it will generally be preferred for the temperature utilized to range between 50° C. and 150° C. Using the rhodium catalyst, it is more preferred for the temperature utilized to be from 65° C. to 100° C.

The optimum reaction time for the hydroformylation step in the process of this invention will vary with the catalyst utilized, the catalyst concentration, the syndiotactic 1,2-polybutadiene concentration, the hydrogen/carbon monoxide pressure, the reaction temperature, and the degree to which double bonds in the syndiotactic 1,2-polybutadiene are to be hydroformylated. However, the reaction time employed normally will be between about 15 minutes and about 10 hours. The reaction time will preferably range between about 30 minutes and about 4 hours with the most preferred reaction time for the hydroformylation reaction ranging from about 1 hour to about 2 hours. It should be noted that the hydroformylation step in the process of this invention can be carried out in a continuous manner or in a batch process.

The degree to which the syndiotactic 1,2-polybutadiene is hydroformylated determines the degree to which the syndiotactic 1,2-polybutadiene will ultimately be carboxylated. For instance, if 1% of the double bonds in the syndiotactic 1,2-polybutadiene are hydroformylated, then ultimately 1% of the double bonds in the syndiotactic 1,2-polybutadiene will ultimately be consumed with carboxyl groups being attached at the carbon atom which was the site where the double bond once was. It has been determined that hydroformylating more than about 3% of the double bonds in the syndiotactic 1,2-polybutadiene results in it becoming somewhat rubbery. It is accordingly not desirable to hydroformylate more than about 3% of the double bonds in the syndiotactic 1,2-polybutadiene if the thermoplastic characteristics of the syndiotactic 1,2-polybutadiene are to be maintained. For this reason, in most cases from about 0.1% to about 3% of the double bonds in the syndiotactic 1,2-polybutadiene will be hydroformylated. It will generally be preferred to hydroformylate between about 0.2 and about 1% of the double bonds in the syndiotactic 1,2-polybutadiene.

After the hydroformylation reaction is completed, the formyl syndiotactic 1,2-polybutadiene produced is reacted with oxygen to produce carboxylated syndiotactic 1,2-polybutadiene. This reaction can be depicted as shown below:

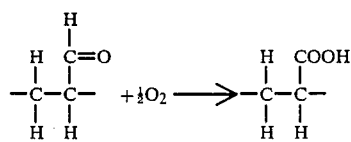

As can be seen, the formyl groups attached to the backbone of the formyl syndiotactic 1,2-polybutadiene react with oxygen and are converted to carboxyl groups. The formyl syndiotactic 1,2-polybutadiene is accordingly converted to carboxylated syndiotactic 1,2-polybutadiene.

The formyl groups on the formyl syndiotactic 1,2-polybutadiene readily react with oxygen without the need for utilizing elevated temperatures or high pressures. In fact, this reaction proceeds quickly at room temperature under atmospheric pressure. Additionally, air has proven to provide an adequate supply of oxygen to promote this reaction. As a matter of convenience, this reaction will normally be carried out at a temperature within the range of about 0° C. to about 100° C. at a pressure which is within the range of about 1 atmosphere ($1.013 \times 10^5$ Pascals) to about 150 atmospheres ($1.52 \times 10^7$ Pascals). The time required in order to attain conversions of near 100% will vary with the reaction conditions but will normally be within the range of about 15 minutes to about 10 hours when air is utilized as the oxygen source.

In many cases it will be convenient to carry out this reaction between oxygen and the formyl syndiotactic 1,2-polybutadiene during the process of drying the polymer after it is recovered from the hydroformylation mixture. For instance, after the hydroformylation reaction has been completed, the formyl syndiotactic 1,2-polybutadiene can be recovered from the hydroformylation mixture by decantation or filtration. After the formyl syndiotactic 1,2-polybutadiene is recovered from the hydroformylation mixture, it can be washed with suitable organic solvents if desired and then air dried. The process of air drying the formyl syndiotactic 1,2-polybutadiene will simultaneously cause the formyl groups therein to react with oxygen thereby converting the formyl syndiotactic 1,2-polybutadiene into carboxylated syndiotactic 1,2-polybutadiene. Such a drying procedure can be carried out by simply passing air through the granules of formyl syndiotactic 1,2-polybutadiene that are recovered at room temperature or at an elevated temperature.

The carboxylated syndiotactic 1,2-polybutadiene recovered will typically contain less than about 3% carboxyl groups based upon the total number of carboxyl groups and double bonds in the carboxylated syndiotactic 1,2-polybutadiene. The carboxylated syndiotactic 1,2-polybutadiene made for most applications will preferably contain from about 0.2% to about 1% carboxyl groups based upon the total number of carboxyl groups and double bonds in the carboxylated syndiotactic 1,2-polybutadiene.

The carboxylated syndiotactic 1,2-polybutadiene made in accordance with the process of this invention can be blended into a wide variety of rubbers utilizing standard mixing techniques. For instance, the carboxylated syndiotactic 1,2-polybutadiene can be blended with a rubber in a Banbury mixer or on a mill mixer.

The mixing temperature utilized will normally be above the melting point of the carboxylated syndiotactic 1,2-polybutadiene employed. However, in order to minimize degradation of the rubber during the blending process, the temperature utilized will normally be only slightly above the melting point of the carboxylated syndiotactic 1,2-polybutadiene.

The following examples are merely for the purpose of illustration and are not to be regarded as limiting the scope of the invention or the manner in which it can be practiced. Unless specifically indicated otherwise, parts and percentages are given by weight.

EXAMPLE 1

A 1-liter stainless steel autoclave was charged with 40 g of syndiotactic 1,2-polybutadiene having a melting point of 195° C., 400 g of toluene, 250 mg of hydridocarbonyltris(triphenylphosphine) rhodium, and 250 psig ($1.8 \times 10^6$ Pascals) of a 50/50 percent mixture of carbon monoxide and hydrogen. The hydroformylation mixture prepared was heated to 65–70° C. and vigorously stirred. After 74 minutes a pressure uptake of about 50 psi ($3.4 \times 10^5$ Pascals) was observed. The autoclave was open and the hydroformylation mixture containing the hydridocarbonyltris(triphenylphosphine) rhodium catalyst was decanted from the formyl syndiotactic 1,2-polybutadiene The formyl syndiotactic 1,2-polybutadiene was washed with 400 g quantities of toluene two times. It was then dried in a fritted funnel with air being pulled over the polymer granules for several hours.

Fourier Transform Infrared Analysis showed the presence of carboxylic acid groups on the syndiotactic 1,2-polybutadiene which was recovered. It was determined by differential scanning calorimetry to have a melting point of 175° C. The carboxylated syndiotactic 1,2-polybutadiene produced was determined to contain about 5% carboxyl groups based upon the total number of carboxyl groups and double bonds in the polymer.

This example shows that the process of this invention can be used to carboxylate syndiotactic 1,2-polybutadiene. By utilizing the process of this invention, carboxylated syndiotactic 1,2-polybutadiene can be prepared on a commercial basis.

While certain representative embodiments and details have been shown for the purpose of illustrating this invention, it will be apparent to those skilled in the art that various changes and modifications can be made therein without departing from the scope of this invention.

What is claimed is:

1. The carboxylated syndiotactic 1,2-polybutadiene made by [the method specified in claim 1] a process which comprises: (1) reacting syndiotactic 1,2-polybutadiene with hydrogen and carbon monoxide in an organic medium to produce formyl syndiotactic 1,2-polybutadiene, wherein the syndiotactic 1,2-polybutadiene is in the form of small particles having a particle size of less than about 250 microns which are suspended in the organic medium; and (2) reacting the formyl syndiotactic 1,2-polybutadiene with oxygen to produce the carboxylated syndiotactic 1,2-polybutadiene.

2. The carboxylated syndiotactic 1,2-polybutadiene made by a process which comprises: (1) hydroformylating syndiotactic 1,2-polybutadiene in an organic medium, wherein the syndiotactic 1,2-polybutadiene is in the form of small particles having a particle size of less than about 250 microns which are suspended in the organic medium, and hydroformylated in the presence of hydrogen, carbon monoxide, and a hydroformylation catalyst at a temperature which is within the range of about 25° C. to about 150° C. and at a pressure of at least about $1.013 \times 10^5$ Pascals, to produce formyl syndiotactic 1,2-polybutadiene; and (2) reacting the formyl syndiotactic 1,2-polybutadiene with oxygen to produce the carboxylated syndiotactic 1,2-polybutadiene.

3. The carboxylated syndiotactic 1,2-polybutadiene as specified in claim 1 wherein the syndiotactic 1,2-polybutadiene is reacted with hydrogen and carbon monoxide in the presence of hydridocarbonyltris (triphenylphosphine) rhodium.

4. The carboxylated syndiotactic 1,2-polybutadiene as specified in claim 2 wherein the hydroformylation catalyst is selected from the group consisting of hydridocarbonyltris (triphenylphosphine) cobalt, hydridocarbonyltris (triphenylphosphine) rhodium, hydridocarbonyltris (triphenylphosphine) iridium, and cobalt carbonyls.

5. The carboxylated syndiotactic 1,2-polybutadiene as specified in claim 1 wherein the syndiotactic 1,2-polybutadiene is reacted with hydrogen and carbon monoxide in the presence of a hydroformylation catalyst selected from the group consisting of hydridocarbonyltris (triphenylphosphine) cobalt, hydridocarbonyltris (triphenylphosphine) rhodium, hydridocarbonyltris (triphenylphosphine) iridium, and cobalt carbonyls.

6. The carboxylated syndiotactic 1,2-polybutadiene as specified in claim 2 wherein the hydroformylation catalyst is hydridocarbonyltris (triphenylphosphine) rhodium.

7. The carboxylated syndiotactic 1,2-polybutadiene as specified in claim 3 wherein the syndiotactic 1,2-polybutadiene is reacted with hydrogen and carbon monoxide at a temperature which is within the range of about 65° C. to about 100° C.

8. The carboxylated syndiotactic 1,2-polybutadiene as specified in claim 6 wherein the hydroformylation reaction is carried out at a temperature which is within the range of about 65° C. to about 100° C.

9. The carboxylated syndiotactic 1,2-polybutadiene as specified in claim 6 wherein the hydroformylation reaction is carried out at a pressure which is within the range of about $1.4 \times 10^6$ Pascals to about $6.9 \times 10^6$ Pascals.

10. The carboxylated syndiotactic 1,2-polybutadiene as specified in claim 8 wherein the hydroformylation reaction is carried out at a pressure which is within the range of about $1.4 \times 10^6$ Pascals t about $6.9 \times 10^6$ Pascals.

11. The carboxylated syndiotactic 1,2-polybutadiene as specified in claim 1 wherein the small particles have a particle size which is less than about 177 microns.

12. The carboxylated syndiotactic, 1,2-polybutadiene as specified in claim 2 wherein the small particles have a particle size of less than about 177 microns.

13. The carboxylated syndiotactic, 1,2-polybutadiene as specified in claim 2 wherein the small particles have a particle size of less than about 105 microns.

14. The carboxylated syndiotactic 1,2-polybutadiene as specified in claim 10 wherein the small particles have a particle size which is less than about 177 microns.

15. The carboxylated syndiotactic 1,2-polybutadiene as specified in claim 1 wherein the formyl syndiotactic 1,2-polybutadiene is reacted with oxygen which is present in air.

16. The carboxylated syndiotactic 1,2-polybutadiene as specified in claim 2 wherein the formyl syndiotactic 1,2-polybutadiene is reacted with oxygen which is present in air.

17. The carboxylated syndiotactic 1.2-polybutadiene as specified in claim 15 wherein after the hydroformylation reaction has been completed, the formyl syndiotactic 1,2 polybutadiene produced is subsequently reacted with oxygen during a drying process to produce the carboxylated syndiotactic 1,2-polybutadiene.

18. The carboxylated syndiotactic 1,2-polybutadiene as specified in claim 2 wherein the syndiotactic 1,2-polybutadiene is reacted with hydrogen and carbon monoxide in the presence of a cobalt carbonyl catalyst.

19. The carboxylated syndiotactic 1,2-polybutadiene as specified in claim 18 wherein the syndiotactic 1,2-polybutadiene is reacted with hydrogen and carbon monoxide at a temperature which is within the range of about 80° C. to about 150° C. and a pressure which is within the range of about $1.8 \times 10^6$ Pascals to about $6.9 \times 10^6$ Pascals.

20. The carboxylated syndiotactic 1,2-polybutadiene as specified in claim 19 wherein the syndiotactic 1,2-polybutadiene is reacted with oxygen which is present in air.

21. The carboxylated syndiotactic 1,2-polybutadiene as specified in claim 20 wherein the small particles have a particle size of less than about 177 microns.

* * * * *